(12) United States Patent
Bouyoucos et al.

(10) Patent No.: US 6,771,561 B2
(45) Date of Patent: Aug. 3, 2004

(54) SONAR SYSTEM ESPECIALLY FOR SHALLOW WATER APPLICATION SUCH AS IN LITTORAL ENVIRONMENTS

(75) Inventors: John V. Bouyoucos, Rochester, NY (US); Dennis R. Courtright, Canandaigua, NY (US); David P. Hollinger, Avon, NY (US)

(73) Assignee: Hydroacoustics Inc., Rochester, NY (US)

( * ) Notice: Subject to any disclaimer, the term of this patent is extended or adjusted under 35 U.S.C. 154(b) by 470 days.

(21) Appl. No.: 09/882,329

(22) Filed: Jun. 15, 2001

(65) Prior Publication Data

US 2004/0125700 A1 Jul. 1, 2004

Related U.S. Application Data

(60) Provisional application No. 60/214,159, filed on Jun. 26, 2000.

(51) Int. Cl.[7] .................................................. G01S 15/00
(52) U.S. Cl. ........................................................ 367/100
(58) Field of Search .............................. 367/87, 88, 99, 367/100, 103, 118, 119

(56) References Cited

U.S. PATENT DOCUMENTS

| 4,998,224 A | * | 3/1991 | Hundt | 367/100 |
| 5,541,893 A | * | 7/1996 | Smith | 367/135 |
| 5,555,532 A | * | 9/1996 | Sacha | 367/100 |

* cited by examiner

Primary Examiner—Ian J. Lobo
(74) Attorney, Agent, or Firm—Martin Lukacher

(57) ABSTRACT

In order to optimize detection of targets from a broadband return, a multiplicity of narrow bands are matched-filter processed simultaneously in parallel. The band or bands which provide the best joint combination of target and propagation in response are used for target detection.

11 Claims, 1 Drawing Sheet

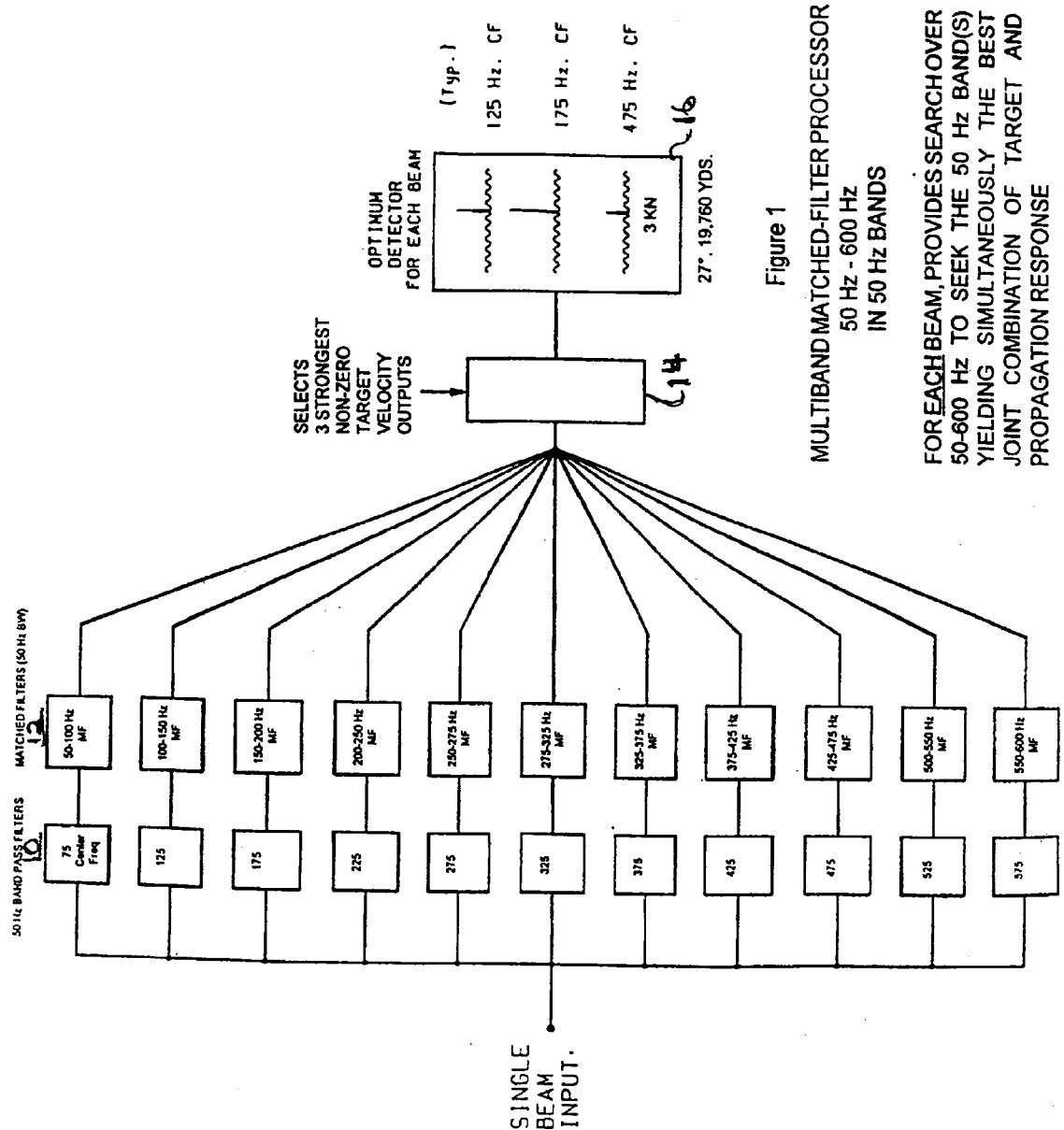

SONAR SYSTEM ESPECIALLY FOR SHALLOW WATER APPLICATION SUCH AS IN LITTORAL ENVIRONMENTS

This application claims priority from U.S. Provisional Application No. 60/214,159, filed Jun. 26, 2000.

DESCRIPTION

The present invention relates to sonar system useful for active submarine detection especially in shallow water littoral environments.

A system according to the invention uses a broadband source, such as a multiple pulse airgun array, whereby the broad transmitted bandwidth of, say, from below 50 to above 600 Hz can be processed simultaneously in a multiplicity of narrower sub-bands, to seek the maximum target return against propagation loss, noise and reverberation at any aspect the target chooses to present (or inadvertenty presents) to the detection system (hydrophone array). The system may also use a broadband single transmission for use with broadband processing techniques to select a narrow band having maximum target return.

It is well known that the target strength of a submarine varies with submarine class, frequency and aspect. Furthermore, the propagation loss through the water varies with frequency, depth, and bottom composition. Additionally, reverberation caused by the surface and bottom structure can be a severe impediment to active submarine detection.

In light of the above many factors that can influence submarine detectability, there has arisen a school of thought that has focused on using broadband single-shot transmissions to blanket the frequency ranges that propagate well, to minimize reverberation through reduced "spot" size, and to use neural networks or other advanced processing means to recognize submarine target echoes from those of rocks and irregular bottom features. These steps have met with some success, but the reduction of reverberation and clutter, particularly, has been sufficiently limited in certain instances to make it desirable to seek other (or additional) solutions. Reverberation encompasses acoustic reflections from the irregular structure of the water column due to temperature, salinity and current fluctuations. Clutter generally encompasses returns from irregular structure in the bottom including fluctuations in density, irregular rock formations, etc.

Reverberation and clutter have been addressed by transmitting a sequence of closely-spaced transmissions and matched-filter processing the returned signals. Such processing can provide 20 to 40 dB of reverberation/clutter suppression and contribute to the improved illumination of a moving target.

Although matched-filter processing can be done on a broad band basis, there is considerable advantage to restricting processing bandwidth to narrower (e.g., 50 Hz) bands which provide steeper slopes to the processed Q functions, allowing for the detection of slow moving targets, such as ½ to 1 knot observed velocity with respect to the bottom.

For any broadband source (for example, an airgun array), a large number of multiple, narrow (e.g., 50 Hz) frequency bands are available for use, and, in principle, specific bands could be selected at any given time and location by the operator, based upon prior knowledge of the propagation characteristics of the particular region involved and/or the particular nature of the target being pursued. This approach, which depends on operator selection, while probably effective in some instances, may not be optimum. In general, it is unlikely that the operator can make the choice of the optimum sub-band in real time.

If the operator had a clue as to the aspect the target is presenting to him he could use information on target strength as a function of aspect, that can come from measurements and/or modeling of a scale model submarine of the design that is being pursued, to make a selection of "best" frequency band or bands.

However, the propagation loss between target and interrogating sonar can also fluctuate with frequency, sometimes exhibiting nulls. This fluctuation may defeat or compromise any effort to choose a frequency band based upon the suspected target aspect alone.

Of the many features that impact on target detectability, a feature that is generally under the control of the sonar operator is the frequency or frequency bands of the active transmission. In the case of a wide-band transmission (e.g., from the airgun source) usefully extending from, say, 50 Hz to 600 Hz, the question is, "Which sub-band or bands should be employed by the operator?"

The invention continually takes advantage of the full bandwidth capability of the airgun source and automates much of the submarine search process, to reduce decision making on the part of the operator and yet provide the operator with more information than has heretofore been available.

The invention provides a sonar system with novel signal processing of returns from a target which is interrogated by a broadband transmission. A multiplicity of contiguous narrow (e.g., 50 Hz) bands are match-filter processed in parallel to seek the frequency band giving, on a joint basis, the best contribution of target response and least propagation loss between target and interrogator.

Accordingly, a system provided by the invention is operative to examine, on each beam, all of the relatively narrow (e.g., 50 Hz) frequency bands simultaneously and to instruct the processor to select and exhibit the joint optimum responses for that beam. Each 50 Hz band between 50 Hz and 600 Hz (or other suitable overall band) can be examined in parallel for each beam. The question of which 50 Hz band or bands best present a target response is accommodated since all bands are being searched simultaneously and a computer-aided detection processor with appropriate training can make a detection decision based upon the best band response.

FIG. 1 is a block diagram of a presently preferred signal processor of a sonar system in accordance with this invention. The matched-filter processor, shown in FIG. 1, by exhibiting a target return having a non-zero velocity, also becomes a moving target classifier.

A broadband airgun system, such as described in Bouyoucos U.S. Pat. No. 5,995,452, issued Nov. 30, 1999 (hereby incorporated by this reference), can provide an unparalleled versatility and robustness. Its inherent broad bandwidth enables the FIG. 1 matched-filter processor to expose the optimum detection band(s) at any given instant in time for detection of moving targets, especially in the littorals. Additionally, the use of its full bandwidth on a single shot basis can provide one of the best ways to detect a stationary, bottomed or hovering target.

The single beam input is the detailed return signal from a hydrophone or hydrophone array. A bank 10 of band pass filters divides the broadband 50–800 Hz return signal into separated 50 Hz bands, the center frequencies of which are given in each of the eleven filters shown in FIG. 1. Separate matched filters 12 provide a matched processor. While an analog processor is shown the processors may be digital processors of the type typically used for sonar matched filter detection.

Another detector 14 selects the strongest non-zero target velocity outputs from the processor 14. This automatically seeks 50 Hz band(s) yielding simultaneously the best joint combination of target and propagation response.

A range and azimuth detector 18 of the type conventionally used processes three optimum outputs over a threshold strength to detect azimuth range. A type of combination of outputs and resulting azimuth and range is shown in FIG. 1.

What is claimed is:

1. An active sonar system comprising means for providing a broadband transmission in the direction of an underwater target, which broad bandwidth is sufficient to contain a plurality of sub-bands, and means for simultaneously processing returns for each entire broadband transmission from said target in each sub-band, which means automatically select those specific sub-band(s) for further processing and target detection which sub-bands have simultaneously the best joint combination of target and propagation response.

2. The system of claim 1 wherein said processing means is provided by a multi-band matched-filter processor.

3. The system of claim 2 wherein means are provided for processing output signals from said processor corresponding to the selected sub-band(s) for indicating target range, azimuth and/or velocity.

4. The system of claim 3 wherein said sub-bands are about 50 Hz in width and said transmission covers a band of typically 50–600 Hz.

5. The system of claim 1 wherein said returns are from a single shot of an airgun array which comprises said means for providing said broadband transmission.

6. The system of claim 1 wherein said returns are contained in a single beam input from a multi-beam receiver.

7. The system of claim 1 wherein said automatically select means is operative to select from all said sub-bands at least one which corresponds to the strongest non-zero target velocity output from each of said bands.

8. The system of claim 7 wherein a plurality of about three of said strongest outputs each from different one of said sub-bands are selected.

9. The method of underwater target detection comprising the steps of receiving a broadband return for a target from a broadband transmission, processing said return to simultaneously detect responses from each of a plurality of sub-bands of the broadband transmission, and selecting and processing for target range, direction and/or velocity one or more of said sub-band responses which have the strongest returns.

10. The method of claim 9 wherein said selecting and processing step is carried out to select at least one response representing the strongest non-zero target velocity from all of said plurality of sub-bands.

11. The method of claim 10 whereas said at least one response is a plurality of about three of said responses which represent the strongest non-zero velocity each of said about three of said responses being from different ones of from said sub-bands.

* * * * *